(12) United States Patent
Hernandez et al.

(10) Patent No.: US 9,378,250 B2
(45) Date of Patent: Jun. 28, 2016

(54) SYSTEMS AND METHODS OF DATA ANALYTICS

(71) Applicant: XEROX CORPORATION, Norwalk, CT (US)

(72) Inventors: Andres Quiroz Hernandez, Rochester, NY (US); Saurabh Kataria, Rochester, NY (US); David R Vandervort, Walworth, NY (US)

(73) Assignee: XEROX CORPORATION, Norwalk, CT (US)

( * ) Notice: Subject to any disclaimer, the term of this patent is extended or adjusted under 35 U.S.C. 154(b) by 294 days.

(21) Appl. No.: 13/893,330

(22) Filed: May 13, 2013

(65) Prior Publication Data

US 2014/0337320 A1 Nov. 13, 2014

(51) Int. Cl.
G06F 7/00 (2006.01)
G06F 17/00 (2006.01)
G06F 17/30 (2006.01)

(52) U.S. Cl.
CPC .... *G06F 17/30539* (2013.01); *G06F 17/30398* (2013.01)

(58) Field of Classification Search
CPC .......... G06F 17/30575; G06F 17/3089; G06F 17/30864; G06F 17/30873; G06F 17/27; G06F 17/30952

USPC ............................ 707/1, 3; 709/206; 716/136
See application file for complete search history.

(56) References Cited

U.S. PATENT DOCUMENTS

| | | | |
|---|---|---|---|
| 6,536,018 B1 * | 3/2003 | Chisholm et al. | 716/136 |
| 6,584,464 B1 * | 6/2003 | Warthen | |
| 2002/0111934 A1 * | 8/2002 | Narayan | 707/1 |
| 2006/0168006 A1 * | 7/2006 | Shannon et al. | 709/206 |
| 2008/0104032 A1 * | 5/2008 | Sarkar | 707/3 |
| 2014/0282493 A1 * | 9/2014 | Glover et al. | 717/176 |

* cited by examiner

*Primary Examiner* — Susan Chen
(74) *Attorney, Agent, or Firm* — MH2 Technology Law Group LLP

(57) ABSTRACT

Systems and methods of data analytics, which in various embodiments enable business analysts to apply certain machine learning and analytics algorithms in a self-service manner by binding them to generic business questions that they can be used to answer in particular domains. The general approach may be to define the application of an algorithm to solve specific problems (questions) for particular combinations of a business domain and a data category. At design time, the algorithm may be linked to canonical data within a data category and programmed to run with this canonical data set. At runtime, given a dataset and its category, and a business domain, a user may choose from the corresponding questions and the system may run the algorithm bound to that question.

18 Claims, 10 Drawing Sheets

| | | | | | |
|---|---|---|---|---|---|
| RedTardation | 154562719931047937 | Tue Jul 27 12:42:35 +0 | 11 | 120 | Positive | @bengenn it probably comes down to who romney picks as his vp |
| LatinoBriefingR | 154562719931047938 | Wed Nov 17 16:30:19 - | 20 | 526 | Negative | latino voters: the gop's post-iowa challenge to cut into obama's su |
| wfbor | 154562728302882816 | Thu Sep 10 18:09:45 + | 6 | 309 | Neutral | the new "it" #ricksantorum #mittromney #newtgingrich #nhps |
| MHLeditor | 154562732614627328 | Tue Sep 22 23:36:18 + | 53 | 82 | Neutral | 2012 defense authorization act has supply chain implications: pres |
| DykstraDame | 154562740860624898 | Sun Jan 23 03:33:07 + | 52 | 3935 | Neutral | i am obamacare:http://t.co/19m4iy86 via @moveon #obamacar |
| lovewebdezign | 154562753292250144 | Mon Oct 05 09:26:24 + | 12 | 369 | Neutral | to see conversation in your timeline, click open (top left of tweet). |
| votepaul2012 | 154562757721726977 | Mon Dec 26 00:31:55 - | 1 | 30 | Negative | ap - head of nul said tues #santorum tried 2 leverage stereotypes |
| Not2Fear | 154562757654618113 | Sat Mar 21 23:12:55 + | 82 | 1397 | Negative | page 4 of 366: in the closest vote in the history of the iowa caucus, |
| PaveGrrl | 154562782925303808 | Mon Jun 22 20:56:30 - | 14 | 475 | Positive | current favorite political headline: "santorum surges from behind! |
| ticketforce | 154562782711398400 | Wed Jun 03 22:23:37 - | 24 | 1952 | Neutral | #newtix: onsale today - robert jospe quartet 1/14, richard adams |
| kk_vsam | 154562795474565474 | Tue Aug 18 14:59:57 + | 19 | 1689 | Neutral | iowa caucus results: mitt romney beats rick santorum by 8 votes: w |
| kevined2564 | 154562807784947712 | Wed Jan 04 12:24:41 - | 0 | 2 | Negative | romney barely won and perry going back to texas to reassess hi |

FIG. 5

Social Media

1. What are people saying about text?
2. How do people feel about text?
3. Who should you target for ads based on user influence?

Customer data

1. How many / what kinds of people are using text?

Retail

1. What are people saying about your product?
2. How do people feel about your product?
3. Who should you target for ads based on user influence?

1. How many / what kinds of people are using your product?

Services

1. What are people saying about your service?
2. How do people feel about your service?
3. Who should you target for ads based on user influence?

1. How many / what kinds of people are using your service?

Healthcare

1. What are people saying about your service?
2. How do people feel about your service?
3. Who should you target for campaigns/promotions based on user influence?

1. How many / what kinds of people are taking treatments?
   - What patient factors contribute to particular diagnoses?
   - What are problematic / high-cost users?
   - What is the best way to reach patients?

SYSTEMS AND METHODS OF DATA ANALYTICS

TECHNICAL FIELD

The subject matter of this disclosure relates to data analytics. More particularly, the subject matter of this disclosure relates to systems and methods including applications and questions to facilitate the use of data analytics algorithms.

BACKGROUND

The problem of selecting an appropriate method (algorithm) for analyzing data in a business setting is one that requires different areas of knowledge that are often not possessed by a single individual. On one hand, data analysis and machine learning algorithms are complex, and knowing when and how to apply them depends on multiple factors, including the problem being solved, the characteristics of the data, the configuration parameters required, etc. The knowledge required for knowing which algorithm to apply for a given problem and how to do so is most often possessed by an experienced statistician or data scientist. On the other hand, the data that needs to be analyzed and input to these algorithms is best understood and interpreted by someone connected to the business and the business rules that govern the generation, collection, and relationships in the data. Additionally, this business analyst is the one most knowledgeable of the business problems and applications that would benefit from the analytics tools known by the data scientist.

For all but the simplest of tasks, therefore, data analytics is currently a complex, domain and application dependent, and interactive endeavor, where data and business analysts must complement each other and their skills. However, the cloud (as a service) model disrupts this current practice by providing easy access to data, storage, computation, and algorithms in unified platforms for self-service. Thus, there is a need to enable this self-service model as much as possible so that a business analyst can use a cloud analytics platform, or other data analytics, on demand, reducing the need for intervention from a data scientist. This is not the case with current analytics and machine learning libraries, toolkits, and applications that provide a wide range of configurable analytics algorithms, but little or no hints about the business problems they solve and when they are applicable.

SUMMARY

An embodiment is a method of performing data analytics. The method is performed on a data analytics system comprising a non-transitory computer-readable storage medium and a processor attached thereto. The analytics system stores, in the computer-readable storage, one or more applications, each application being associated with an algorithm, each application being further associated with canonical data indicative of a class of data to be accepted by the algorithm associated with the application. The analytics system stores, in the computer-readable storage, one or more questions, each question being associated with an application. The analytics system stores a user dataset associated with a domain and a data category. The analytics system selects a question from the one or more questions. The selected question is selected based at least in part on the domain and the data category of the user dataset. The analytics system matches the user dataset based on the canonical data of the application associated with the selected question. The matching is performed by the processor. The matching comprises comparing one or more fields of the user dataset with the class of data indicated by the canonical data. The matching thereby produces a canonicalized dataset. The analytics system executes the algorithm associated with the application. The canonicalized dataset is provided as input to the algorithm. The analytics system presents output from the algorithm to the user.

Optionally in any of the aforementioned embodiments, each question further comprises a domain and a user category. Selecting the question from the one or more questions comprises identifying a subset of matching questions having the same domain and user category as the domain and the user category of the user dataset.

Optionally in any of the aforementioned embodiments, the one or more questions include a basic question. Selecting the question from the one or more questions further comprises selecting the basic question upon a determination that no question matches the domain and user category of the user dataset.

Optionally in any of the aforementioned embodiments, the basic question includes a question text containing an interpolation flag. Selecting the basic question comprises interpolating user-provided text with the question text of the basic question to produce interpolated question text, and presenting the interpolated question text to a user.

Optionally in any of the aforementioned embodiments, the canonical data identifies one or more data field descriptors. Matching the user dataset based on the canonical data comprises selecting fields from the user dataset based at least in part on the one or more data field descriptors of the canonical data.

Optionally in any of the aforementioned embodiments, each application further comprises data indicative of a mapping to the algorithm of the application. Executing the algorithm associated with the application comprises mapping the canonicalized data to the input to the algorithm based on the data indicative of the mapping.

Optionally in any of the aforementioned embodiments, the user dataset is received from an external computer system via a network interface of the analytics system.

Optionally in any of the aforementioned embodiments, the method also includes additional elements. The analytics system identifies a subset of matching questions from the one or more questions based at least in part on the domain and data category of the user dataset. The analytics system transmits, to the external computer system, a user interface identifying the subset of matching questions. The analytics system receives a user form response from the external computer system via the transmitted user interface. Selecting the question from the one or more questions is based at least in part on the user form response.

Optionally in any of the aforementioned embodiments, the canonical data for each application is determined based on an abstraction operation performed by the analytics system. The analytics system identifies an example dataset associated with the application. The analytics system determines one or more field descriptors based on the example dataset.

Optionally in any of the aforementioned embodiments, determining the one or more field descriptors is based at least in part on a selection of fields by an operator of the analytics system.

Optionally in any of the aforementioned embodiments, each field descriptor identifies a data type and one or more characteristics of a data field.

Optionally in any of the aforementioned embodiments, the one or more field descriptors are determined based at least in part on inputs associated with the algorithm of the application.

Optionally in any of the aforementioned embodiments, the example dataset is uploaded to the analytics system by an operator of the analytics system.

Optionally in any of the aforementioned embodiments, matching the user dataset based on the canonical data comprises identifying an ambiguity in matching at least one descriptor of the canonical data, and requesting manual interaction to resolve the ambiguity.

Optionally in any of the aforementioned embodiments, the ambiguity involves a descriptor of the canonical data not matching any field of the user dataset or matching multiple fields of the user dataset.

An embodiment is a computer system. The system includes an application store comprising computer-readable storage, having stored therein one or more applications, each application being associated with an algorithm, each application being further associated with canonical data indicative of a class of data to be accepted by the algorithm associated with the application. The system includes a question store comprising computer-readable storage, having stored therein one or more questions, each question being associated with an application. The system includes a user dataset store comprising computer-readable storage, having stored therein a user dataset associated with a domain and a data category. The system includes a question selection module configured to select a question from the one or more questions. The selected question is selected based at least in part on the domain and the data category of the user dataset. The system includes a dataset matching module configured to match the user dataset based on the canonical data of the application associated with the selected question. The matching is performed by the processor. The matching comprises comparing one or more fields of the user dataset with the class of data indicated by the canonical data. The matching thereby produces a canonicalized dataset. The system includes an application execution module configured to execute the algorithm associated with the application. The canonicalized dataset is provided as input to the algorithm.

An embodiment is a method of performing data analytics. The method is performed using a computer processor. The computer processor receives a user dataset. The computer processor selects a question that may be answered with respect to the user dataset from a plurality of questions. The selection is based on stored attributes of the plurality of questions and further being based on attributes of the user dataset. The computer processor reconfigures the user dataset to conform with one or more inputs associated with an algorithm. The algorithm is identified by the computer processor as being configured to respond to the selected question. The computer processor executes the algorithm based on the reconfigured user dataset.

BRIEF DESCRIPTION OF THE DRAWINGS

FIG. 5 is a sample dataset that may be used as an example dataset in the process of constructing an application.

FIG. 7 is a matrix of several examples of questions that may be formulated in an embodiment.

FIG. 9 is a sample user interface that may be displayed during the execution of applications, as used in an embodiment.

DESCRIPTION OF THE EMBODIMENTS

Figure 1:
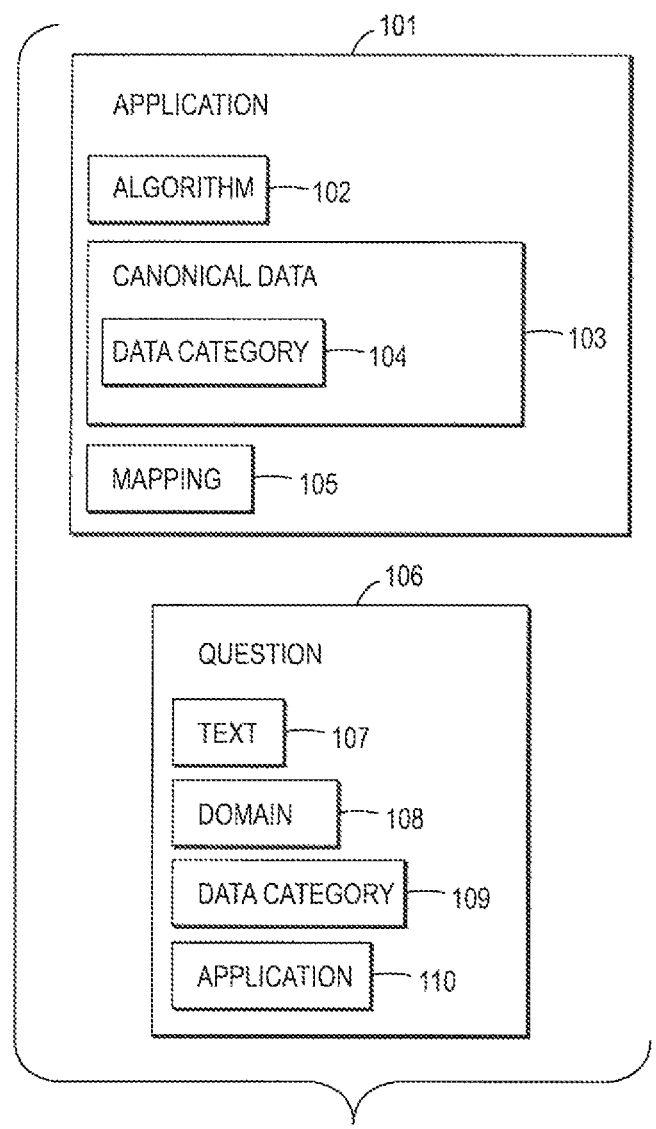
FIG. 1 is a block diagram of data structures that represent certain concepts described herein, in an embodiment.

For simplicity and illustrative purposes, the principles of the present teachings are described by referring mainly to exemplary embodiments thereof. However, one of ordinary skill in the art would readily recognize that the same principles are equally applicable to, and can be implemented in all types of systems, and that any such variations may be included in various embodiments. Moreover, in the following detailed description, references are made to the accompanying figures, which illustrate specific embodiments. Electrical, mechanical, logical and structural changes can be made to various embodiments. It will be understood that the embodiments disclosed may be varied, augmented, or altered, that elements may be exchanged with their equivalents, and that elements may be implemented in many different ways.

Disclosed in various embodiments are systems and methods of data analytics, which may enable business analysts to apply certain machine learning and analytics algorithms in a self-service manner by binding them to generic business questions that they can be used to answer in particular domains. The general approach may be to define the application of an algorithm to solve specific problems (questions) for particular combinations of a business domain and a data category. At design time, the algorithm may be linked to canonical data within a data category and programmed to run with this canonical data set. At runtime, given a dataset and its category, and a business domain, a user may choose from the corresponding questions and the system may run the algorithm bound to that question. Consequently, the user may not need to know the algorithm or how to apply it. Manual steps to adapt the real data set to the algorithm may advantageously be minimized or even eliminated due to use of the domain and data category as well as the likelihood for fitting the given data to the form of the canonical data set.

Generally, various embodiments provide a structure for connecting data analytics algorithms, which apply computational and mathematical processes to transform data, with business-oriented questions and/or other higher-level questions. Non-limiting examples of analytics algorithms include statistical regression, Bayesian analysis, neural networks, decision trees, and the like. Business-oriented questions may include consumer sentiments about a product or service, types of advertisements for targeting toward customers, health care treatment recommendations, and so on.

Some embodiments generally incorporate a two-phase structure for implementing the aforementioned connection of algorithms to business questions. In a first phase, called the "offline phase," algorithms and data structures are associated into "applications," and one or more "questions" are associated with those applications, the questions being formulated to address business concerns or other appropriate interests as desired by the operator of the offline phase. The applications and questions are rendered to computer-readable storage. In the second phase, called the "online phase," users upload data sets of interest. A computer system may analyze the uploaded data sets and identify appropriate questions and/or applications that may be applied to the provided data, and the system may then perform the desired analyses for the users.

These and other concepts, as used in certain embodiments, are described in greater detail with reference to the Figures.

FIG. 1 is a block diagram of data structures that represent certain concepts described above, in an embodiment. The data structures may be stored on computer-readable media such as a hard drive, SSD, tape backup, distributed storage, cloud storage, and so on, and may be structured as relational database tables, flat files, C structures, programming language objects, database objects, and the like. Elements of the data structures may be arranged differently in various embodiments, elements may be added and/or removed, and related elements may be associated through references, pointers, links, substructures, foreign keys, and so on.

In the embodiment of FIG. 1, application 101 represents a use of a particular analytics technique applied to a type or class of data. Application 101 may include one or more algorithms 102. An algorithm may be any computational, mathematical or other procedure that takes a dataset as input, possibly along with other inputs, and generates one or more outputs based on the input data. For example, a linear regression algorithm may receive as input independent and/or dependent variable data, and produce as output one or more coefficients of correlation. It is often, though not necessarily, the case that algorithms are neutral to the semantics of the data. A linear regression algorithm, for example, may operate on sales data, consumer data, public data, medical data, and so on. In addition to linear regression, examples of algorithms may include text classification, Bayesian analysis, sentiment analysis, support vector machines, neural networks, and so on.

Application 101 may further include canonical data 103. Canonical data may include any representation of a class of data that may be accepted for input to algorithms 102. Typically a class of data will be represented through characteristics of the structure of acceptable data. The canonical data may be used, as explained in greater detail further in this specification, to process a user-provided dataset to conform to the inputs required by the algorithms 102; that is, to "canonicalize" the user dataset.

For example, canonical data 103 may identify a set of fields and data types, akin to a database table schema or in-memory data structure. Canonical data may optionally include qualifications, or "descriptors," on each of the fields, for example restricting an integer-type field to positive integers. Canonical data may optionally include mechanisms of selecting among multiple candidate fields. For example, an application associated with a text classification algorithm may identify, in its canonical data, to use the text strings with the longest length for the classification procedure, so that where a user presents a dataset with multiple text string fields, only the field with the longest strings are used as input to the text classification algorithm.

Canonical data 103 may include data category 104, which may be a general or specific identifier of the type of dataset expected by canonical data 103. Data category 104 may be used to identify the semantic content of the data, so example data categories may include social media data, customer data, and the like. Creators of applications 101 may select data categories to correspond with their types of datasets expected to be submitted by users of those applications. Although the depicted embodiment includes a single data category 104 for each canonical data 103, in alternate embodiments multiple data categories may be included.

Application 101 may further include mapping 105, which may specify a conversion between canonical data 103 and the expected inputs for algorithms 102. The mapping may be represented in various ways, such as a conversion table between input names, an ordering of fields in the canonical data, a computer script, executable code, and the like. In some cases, the mapping between the algorithms 102 and the canonical data 103 may be determinable from the canonical data 103 alone, in which case a separate mapping element 105 may be unnecessary.

Question 106 represents a user-oriented problem that may be answered through use of one or more applications 101. A question 106 may include text 107 to be presented to the user. The text may indicate the nature of the problem that may be answered. Examples of question texts are presented in various embodiments below. In some embodiments, the question text may be configured to be dynamic or adaptive, through inclusion of interpolated variables for example. Such configuration may be used to make questions adaptable to multiple similar situations. For example, a question relating to social media sentiments about various candidates in an election may include text like "What are people saying about candidate [NAME]," where [NAME] can be filled in with a candidate of interest, perhaps as specified by a user.

Question 106 may further include a domain 108, which may identify a category of data appropriate to the question. The domain may be represented as a text string and identify, for example, a particular business sector or area appropriate to the question. Examples of such domains include retail, business services, healthcare, and the like. Questions 106 may further include a data category 109, corresponding to the data category element 104 of applications. Accordingly, domains and data categories may represent a two-dimensional space of business interests and data sources, with each question 106 encompassing a segment of that space where useful information may be provided out of a given data source for a particular business interest. This two-dimensional model is discussed further below in this specification. Although the depicted embodiment includes one data category and domain per question, in various embodiments questions may include multiple data categories and/or domains, in which case dynamically adaptable texts 107 may advantageously enable the question to encompass those multiple categories and/or domains.

Question 106 may further be associated with an application 110, corresponding to application 101, which may be executed as described below in order to answer the question for users. In various embodiments, a question may be associated with multiple applications, for example to enable chaining or pipelining of applications. Of note, because the application identifies data category 104 through its canonical data 103, the additional identification of a data category 109 in question 106 may be redundant and optionally not present in some embodiments, particularly those where a single data category is included for both applications and questions (although the presence of the data category in both data structures may improve performance and speed of access).

A key advantage of the aforementioned data structure arrangement is that it bridges algorithms of different specificities with business questions. Various algorithms have different degrees of specialization. For example, there are general purpose algorithms such as SVM and Bayesian algorithms for classification, and k-means for clustering. Other algorithms may be more specialized for text data and for particular applications, such as for example a Sentiment Analysis algorithm that classifies text according to positive, neutral, or negative sentiment. Even though general purpose algorithms can be used to answer arbitrarily many different kinds of business questions, within a particular business domain and for specific categories of data within that domain, there may be a set of questions that the algorithms are typically used to answer and a general way of applying those algorithms to data within each category, as embodied in applications and questions.

Figure 2:
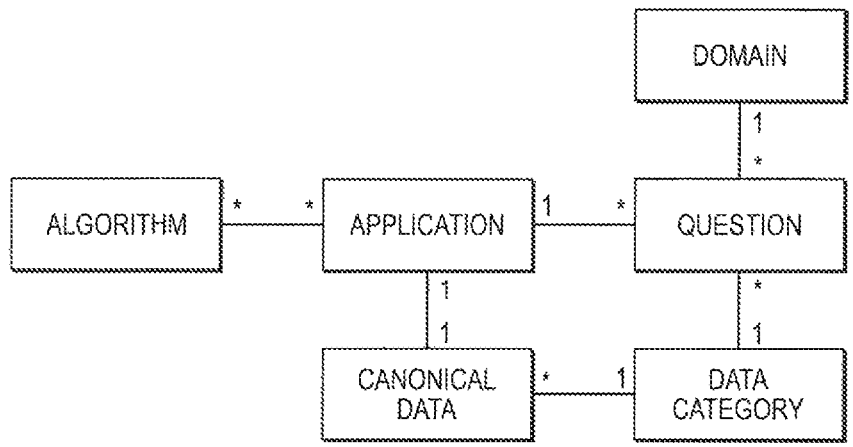
FIG. 2 is a UML-like alternate representation of the data structure concepts, as used in an embodiment.

FIG. 2 is a UML-like alternate representation of the data structure concepts presented in FIG. 1. This representation identifies relations between the various objects through the lines and identifiers between blocks such that, for example, a line with two asterisks represents a many-to-many relation and a line with a numeral 1 and an asterisk represents a one-to-many relation. In alternate embodiments, different relations between objects may be employed, and/or different objects may be associated with each other.

Figure 3:
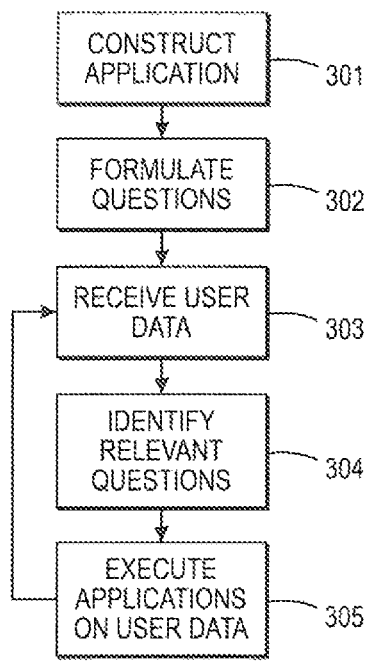
FIG. 3 is a flowchart of a process of setting up and operating a data analytics system, as used in an embodiment.

FIG. 3 is a flowchart of a process of setting up and operating a data analytics system, as used in an embodiment. The process may be performed on one or more computer systems as described below. In various embodiments, additional blocks may be included, some blocks may be removed, and/or blocks may be connected or arranged differently from what is shown.

The process of FIG. 3 may generally be described as having two phases: an "offline" phase in which applications and questions are built, and an "online" phase in which users provide data for analysis. The offline phase corresponds to blocks 301 and 302, while the online phase encompasses blocks 303 through 305. In general a system operator may perform the offline phase while third-party users would perform the online phase, though other arrangements are possible in alternate embodiments. The two phases may be performed at different times, and the online phase may be performed multiple times. Additionally, the offline phase may be performed subsequent to performance of the online phase, for example to add new applications or update existing ones on an analytics system.

At block 301, the operator constructs one or more applications. The applications may have a structure like application 101 of FIG. 1, and be stored in computer-readable storage of the analytics system. At block 302, the operator formulates one or more questions, such as questions 106 of FIG. 1, and those questions may be stored in computer-readable storage. In alternate embodiments, the formulation of questions may precede or be interleaved with construction of applications.

At block 303, the system receives a user dataset, possibly from an external system such as a user computer. The dataset may be retrieved over a network system such as the Internet and/or be locally accessible to the system. The system may then identify one or more domains and/or data categories, automatically and/or through input from the user, and at block 304 the system may then present relevant questions to the user that may be answered based on the provided dataset. Upon selection of one or more of the questions, automatically and/or through user choice, the system may then execute one or more applications based on the user dataset.

Figure 4:
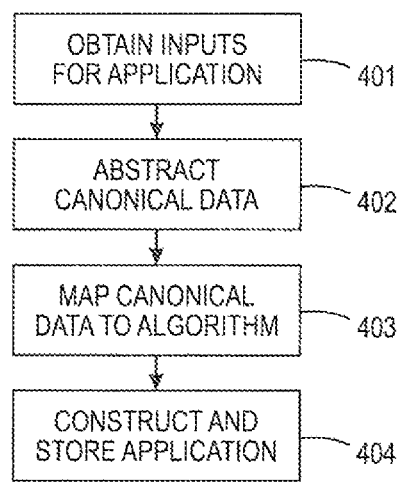
FIG. 4 is a flowchart of a process of constructing an application, as used in an embodiment.

FIG. 4 is a flowchart of a process of constructing an application, as used in an embodiment. The process may be performed by an analytics system, and it may be performed at block 301 of FIG. 3, for example. In various embodiments, additional blocks may be included, some blocks may be removed, and/or blocks may be connected or arranged differently from what is shown.

At block 401, the system obtains canonical data, a data category, and/or an algorithm for constructing the application. The system may obtain this information through a variety of mechanisms. Most simply, the system operator may provide all of the information to the analytics system, possibly through an administrative user interface. Alternately, the operator may provide some of the information and/or related information, and the analytics system may derive the canonical data, data category, and/or algorithm automatically. For example, the operator may refer the system to an external data processor, such as a distributed hash table system, which the operator may categorize by domain and/or data category, and the analytics system may use that external data processor as the algorithm.

In an embodiment, the operator may provide an example dataset and allow the system to determine the canonical data, through a process called "abstraction" at block 402. An example of this process is provided with respect to FIG. 5. Briefly, abstraction may involve identifying relevant fields in a dataset and appropriate descriptors of those fields, which may be combined into the canonical data. Choosing the descriptors has consequences, beyond properly generalizing the application, such as performance (the more sophisticated the matching criteria is, the more complex and time-sensitive the matching of the data has to be). Various approaches to identifying the descriptors may be employed. At its simplest, the system may query the operator to identify the descriptors of the appropriate fields, perhaps through an interactive wizard or other interface. More advanced embodiments may automatically or partially automatically select fields and/or descriptors of those fields, based on the nature of the algorithm, the nature of the example dataset, and/or other information.

Of note is that the terms "canonical data" and "user datasets" are not necessarily the same as the terms "training data" and "test data" as used in the art of machine learning. The application in this example happens to be a machine learning task, and its implementation may accept both training (text+labels) and test data (text only), depending on the question relating to the business problem.

At block 403, the system maps the canonical data to the algorithm. For example, where the canonical data identifies several data fields and the algorithm receives multiple arguments as inputs, this mapping may involve determining which fields of the canonical data to use for each argument. Thus, mapping 105 of FIG. 1 may be constructed in some embodiments. At block 404, the application constructed through the previous processes may then be stored to computer-readable storage for later execution.

FIG. 5 is a sample dataset that may be used as an example dataset in the process of constructing an application. The sample dataset may be used as input for the processes of abstraction and data mapping, corresponding to blocks 402 and 403 of FIG. 4, for example.

With respect to FIG. 5, construction of an example application is described. In this non-limiting example, a machine learning algorithm for classification is used to analyze a social media data set for the problem of sentiment identification. For this example, the data category is social media, the application is sentiment analysis and the algorithm is an appropriate classifier (e.g. Naïve Bayes). This example is independent of a particular domain, though other examples of abstraction may be domain-specific.

The example dataset corresponds to a hypothetical Twitter feed, whose tweets have been labeled according to their sentiment. For the sentiment analysis application, only those two fields, namely the tweet text and sentiment label, may be used. In order to abstract the canonical data set, those fields must be described in a manner that is specific enough to avoid ambiguity with other fields (text or string is too broad), but general enough to allow for different data sets that will be presented to the algorithm at runtime (tweet text is too specific).

For this example, during the process of abstraction, the text field is described as the longest text field in the data, and the sentiment label as a categorical field with three categories. In alternate embodiments, the abstraction process may select different descriptors for these fields, such as multi-word text, or added specificity such as matching the category labels against a set of known sentiment descriptors (e.g. "positive", "good", "+"). As explained previously, factors that may be relevant to the selection of descriptors may include generalizability of the application and application performance.

Once the canonical data is constructed, it can be mapped to the algorithm so that the algorithm may run in terms of that canonical data, converted to appropriate parameters of the algorithm. As an advantageous consequence of the aforementioned processes of abstraction and mapping, users may present datasets with different fields and field ordering (for example, Facebook data that first has a timestamp, a user, text, liked, etc.), but as long as it has a longest text field and a categorical field with three labels, it can be fed to the algorithm by the application.

Figure 6:
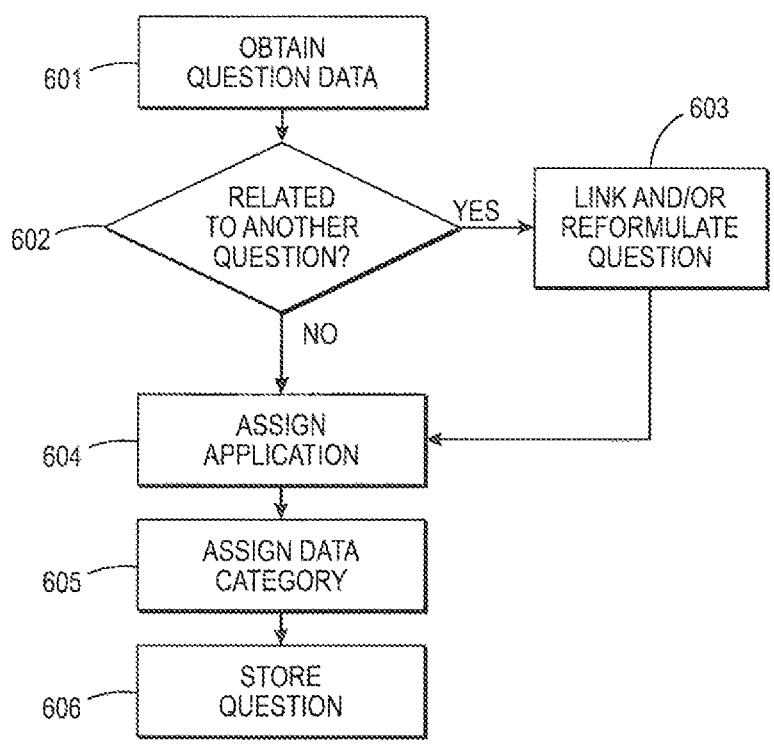
FIG. 6 is a flowchart of a process of formulating questions, as used in an embodiment.

FIG. 6 is a flowchart of a process of formulating questions, as used in an embodiment. The process may be performed by an analytics system, and it may be performed at block 302 of FIG. 3, for example. In various embodiments, additional blocks may be included, some blocks may be removed, and/or blocks may be connected or arranged differently from what is shown.

Questions may be formulated by an operator of the analytics system, according to experience with typical, valuable, or otherwise required questions of generalized interest that the given applications are designed to answer in particular domains. In one simple example, an application applies to a single domain, and a single question may be formulated for it. In the example with respect to FIG. 5, a question relating to the political domain may be formulated as: "How do people feel about the presidential campaign?"

The sample question above, in relation to the sample application of FIG. 5, may correspond to a domain (politics), a data category (social media data), and an example application (sentiment analysis). These associations can be stored (e.g., in a database) and retrieved at runtime, for example in question data structure 106 of FIG. 1. In many cases, an application may be usable with multiple domains for the same data category, as is the case with the example of FIG. 5, so that multiple questions for the same application can be formulated.

At block 601, the analytics system may obtain question data, possibly including an identifier of a domain. The question data may include, among other things, the question text. At block 602, the system determines if there is a relationship between the question being formulated and one or more other questions. If so, then at block 603 the question being formulated is linked and/or reformulated. Linking questions in this way may enable extensibility to further domains, as they may store question templates that can be completed for new domains, and linking may further enable the display of questions for underspecified queries, as described below. A relationship between questions may be identified based on factors such as identical or similar domains, identical or similar data categories, identical or similar question texts, use of the same application or similar applications, and so on.

At block 604, the question is assigned an application. The application may be selected by an operator of the analytics system. In an embodiment, the question may be formulated prior to the existence of the application, in which case the question may be stored without an assigned application and assigned an application later. This advantageously enables questions to be formulated before construction of particular applications, possibly motivating the creation of those applications.

At block 605, one or more data categories are assigned to the question. The data category may be determined based on the data category of the canonical data of the application, based on other data of the application, based on other data associated with the question, based on user input, and/or based on other sources. At block 606, the question is stored in computer storage for later use, such as the online phase as described above.

FIG. 7 is a matrix of several examples of questions that may be formulated in an embodiment. The rows of the matrix represent three possible domains, namely retail, services, and healthcare. The columns of the matrix represent two possible data categories, namely social media data and customer data. In various embodiments, these domains and data categories are represented within application and question data structures, such as structures 101 and 106 of FIG. 1. The domains, data categories, and questions presented in FIG. 7 are intended to be exemplary and non-limiting.

The questions at the intersections of the domains/categories are those that have been formulated and assigned to the corresponding domain/category combination. As explained previously, it is generally the case that each application has a single data category, so each question is associated to one application.

FIG. 7 also shows basic questions for each data category, those basic questions not being associated with a particular domain, and the numbering of questions may be used as links among questions within each data category. In some embodiments, basic questions may be associated with only a domain, only a data category, with multiple domains/data categories, and other such combinations. As can be seen, the linked questions may have similar formulations that differ slightly by domain. Thus, as explained previously, linking may be used to assist in producing text for new questions for other domains as they are being formulated by the operator. It may also be used for underspecified user queries during the online phase, such as where a user desires information for a domain not known to the analytics system. As one example, the question, "How do people feel about text" is stored for the social media data category, so that adding the political domain described earlier may be simplified by simply filling in "text" as "the presidential campaign."

Figure 8:
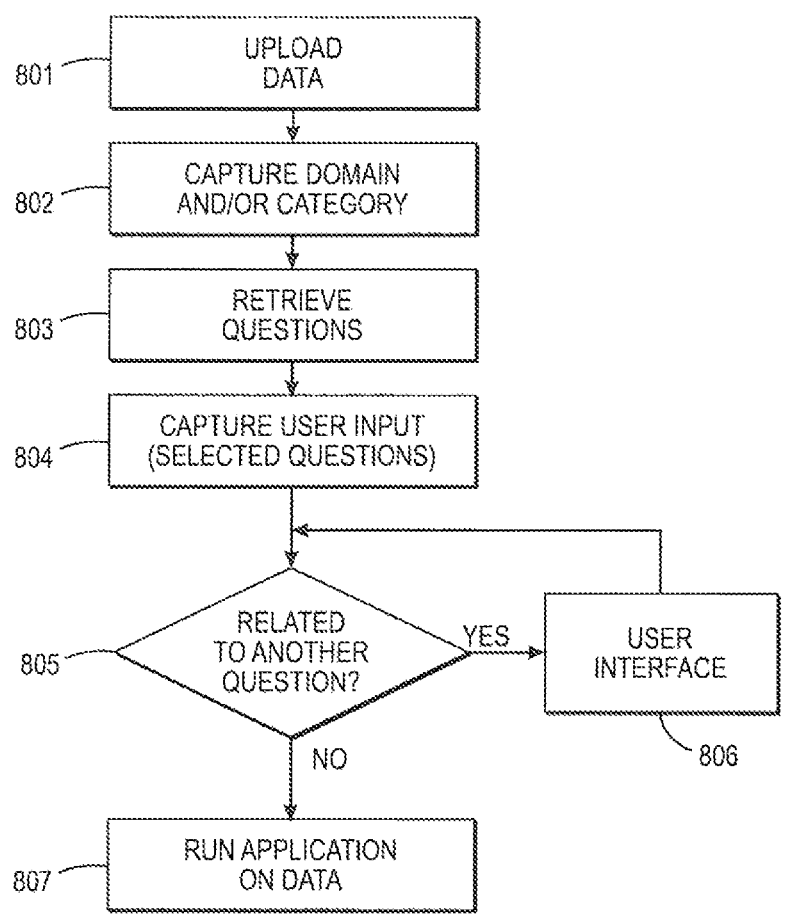
FIG. 8 is a flowchart of a process of executing applications, as used in an embodiment.

FIG. 8 is a flowchart of a process of executing applications, as used in an embodiment. The process corresponds to the "online" phase described previously, and may be performed by an analytics system possibly interacting with a user on an external system and communicating via a network and/or other mechanism. In various embodiments, additional blocks may be included, some blocks may be removed, and/or blocks may be connected or arranged differently from what is shown.

At block 801, a user may upload a user dataset for analysis. The system may then capture the domain and/or data category at block 802, through a variety of techniques in various embodiments. For the domain, the user may have specified it when registering or signing in to the platform, and/or when uploading the dataset. For the data category, the user may specify it upon upload, or the platform may employ an automated method to infer it from the data, possibly based on the characteristics of the data fields. Thus, the domain and/or data category may be identified by automatic and/or manual processes.

Given a domain and data category, the system may retrieve the questions that were stored for them at block 803. These questions may be presented to the user via a user interface. Advantageously, the interface may show the user the options that are available for the analysis of their data, in a way that a non-expert user can easily relate to their business problems and/or goals. The more applications that are made available for different domains and data categories there are, the more likely it will be that a user will find a question/analysis of interest, especially if the questions are typical and generally applicable to the domain and if the user does not have a previously well-defined idea of the kind of insight/information they can obtain from their data. Thus, users may upload a dataset and automatically discover what sorts of analytics and/or insights may be gleaned from that dataset, through operation of the system.

In an embodiment, the system may accept underspecified queries, where the domain and/or data category are not obtained at block 802 or elsewhere. In this case, and depending on the embodiment, a larger set of questions can be presented, such as all questions matching the provided domain or data category, basic questions for a data category, derived questions based on basic questions or template questions, or the like. The basic questions, such as those described in FIG. 7, become especially useful in these cases, because they may prevent showing all of the slightly different versions of the same question. So, for example, if the domain is not specified, the user may see the question "How do people feel about text" or some other generic version of the question.

At block 804, the system receives input indicating a selection of those presented questions, for which analytics are to be performed. In an alternate embodiment, some or all of the questions may be automatically selected.

At block 805, the dataset may be matched with the canonical data description. The system may choose fields from the data that (best) match the descriptors of the canonical data for the application. During this block, the system may determine that all of the descriptors within the canonical data can be matched in the data without ambiguity, or it may determine that at least one descriptor does not match any field in the data set, does not match any field sufficiently, and/or matches more than one field ambiguously. In the former case, the process continues to block 807, where the application may be applied directly with no manual intervention from the user. The output of the application, which may be based on the execution of the associated algorithm, may be presented to the user for viewing or download, and/or it may be used for further execution. In an embodiment, the system first performs a sanity check by accepting the inferred mapping for the application.

Where there is no unambiguous match between the canonical data and the user dataset, some guided manual interaction may be required to complete the matching, as performed at block 806. The interaction may be of various forms in various embodiments, including heuristic matching, a guided wizard interface, a request for modification of the dataset, and/or a request for intervention from a data expert. Generally, however, due to the selected domain and data category used to define and parameterize the application, in many cases the user dataset will share many characteristics with the canonical data. In some embodiments, more sophisticated matching, such as similarity-based matching, may be used at block 805 to increase the likelihood of matching. As can be seen, the techniques for performing matching at block 805 may be similar to those techniques for abstraction used during the offline phase and described with respect to FIG. 4.

Extending the example of FIG. 5 to the online phase, suppose a user uploads Facebook data with "Like" information for each user. It is very likely that the text field will be matched appropriately to the status caption of the Facebook data. The "Like" information is indeed categorical, but only has two category labels (unless "Unlike" were an option), so the matching process of block 805 may find it to be a close enough match to the sentiment label field if no other categorical data is found or the number/kinds of categories are more dissimilar.

Figure 9:
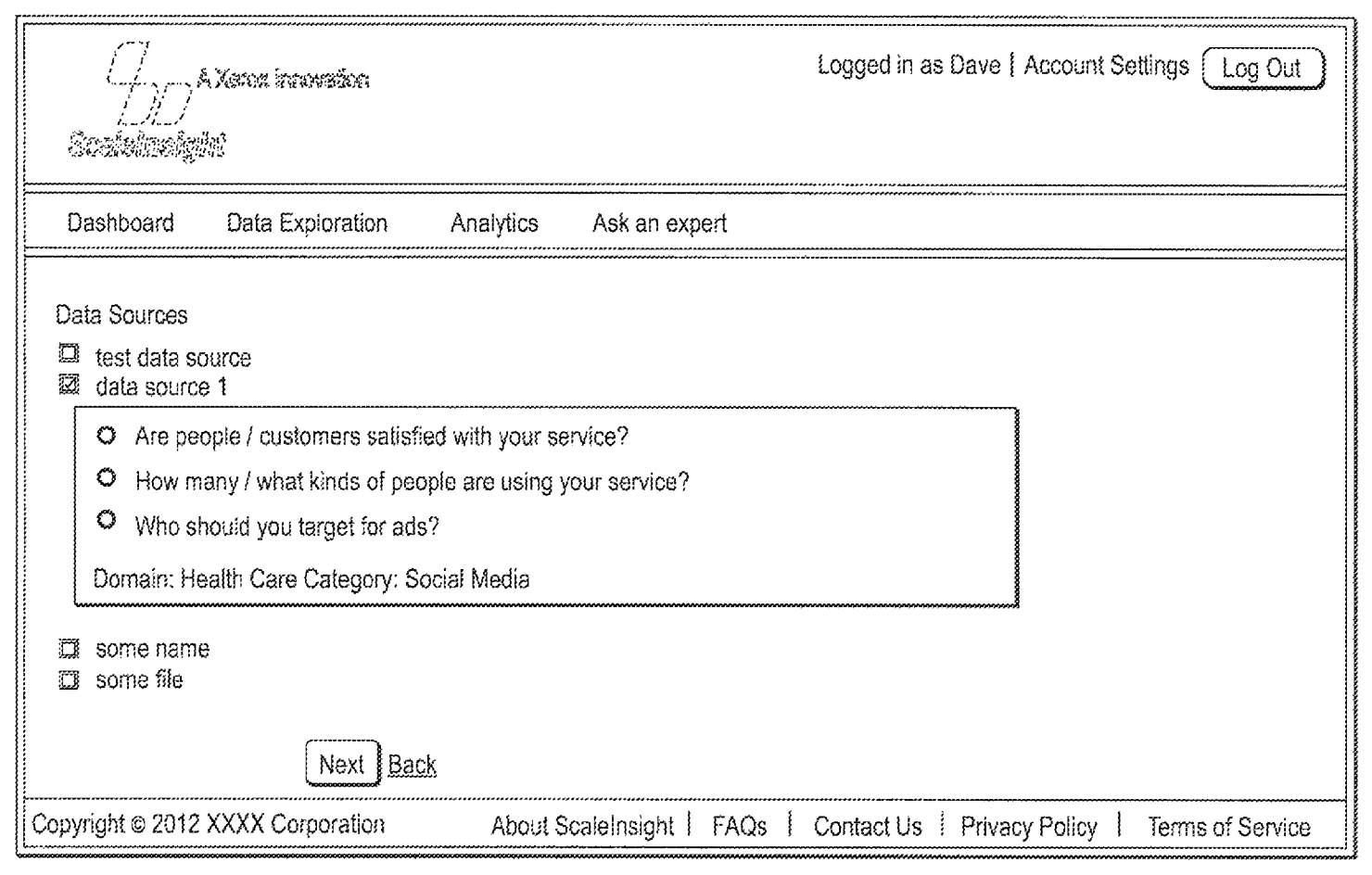

FIG. 9 is a sample user interface that may be displayed during the execution of applications, as used in an embodiment. The user interface may be presented between blocks 803 and 804 of FIG. 8, for example. The sample interface identifies several data sources 901, and for the selected data source presents several questions 902 that may be answered by the analytics system. The domain and data category may also be identified within block 903.

Example Computer System

Figure 10:
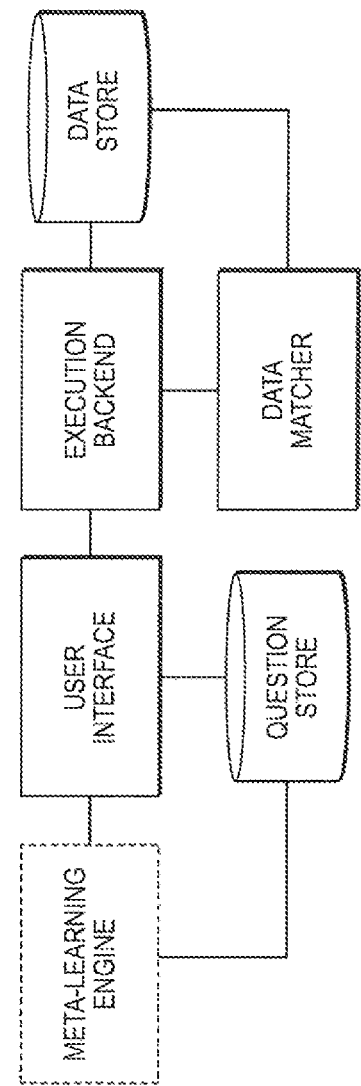
FIG. 10 is a block diagram of an analytics system, as used in an embodiment.

FIG. 10 is a block diagram of an analytics system, as used in an embodiment. The system may perform any or all of the processes described in this specification. In various embodiments, additional blocks may be included, some blocks may be removed, and/or blocks may be connected or arranged differently from what is shown.

User interface module 1001 may be used during the online phase to capture domain and data categories and to present corresponding questions to the user. It may also be used to deploy the algorithm to run on the user's datasets on the execution backend, and may be used to verify the mapping of the data to the canonical data, explore results, and other considerations.

Question store 1002 may store the questions defined, possibly cross-categorized by domain and data category and/or linked to the applications on the execution backend.

Execution backend 1003 may hold application implementations and algorithms used to analyze datasets, and it may manage the infrastructure necessary to run those algorithms. It may be configured to accept data and input that data to applications according to the canonical data. The execution backend may further be used in performance of processes such as application construction and question formulation.

Data matcher 1004 may be employed by the execution backend in its comparison of runtime data with the canonical descriptions, as described with respect to block 805 of FIG. 8.

Data store 1005 may maintain user datasets uploaded by users.

Optional meta-learning engine 1006 may assist in populating the analytics system with applications and corresponding questions. It may use historical information, observe system usage, analyze existing data, and receive expert supervision, to determine useful applications for algorithms in terms of domains, data categories, and questions. In alternate embodiments, operators of the analytics system may perform similar tasks.

Figure 11:
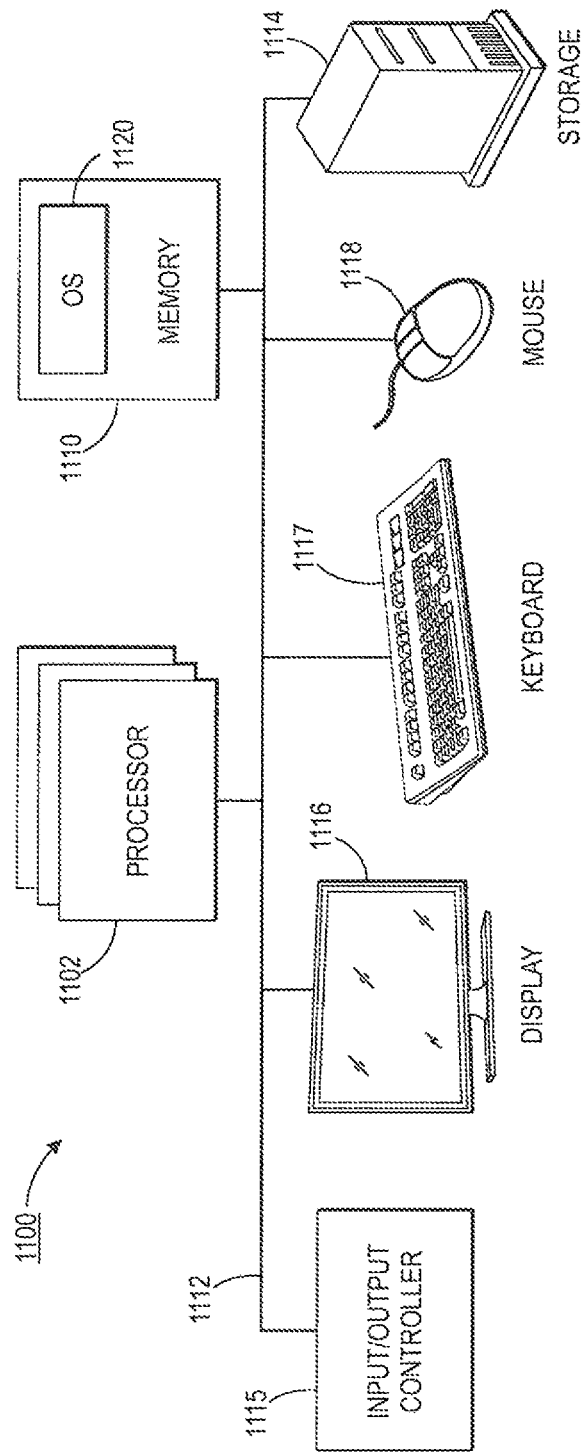
FIG. 11 illustrates a computer system that is consistent with embodiments of the present teachings.

FIG. 11 illustrates a computer system 1100 that is consistent with embodiments of the present teachings. In general, embodiments of an analytics system may be implemented in various computer systems, such as a personal computer, a server, a workstation, an embedded system, or a combination thereof, for example, computer system 1100. Certain embodiments may be embedded as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. However, for purposes of explanation, system 1100 is shown as a general purpose computer that is well known to those skilled in the art. Examples of the components that may be included in system 1100 will now be described.

As shown, system 1100 may include at least one processor 1102, a keyboard 1117, a pointing device 1118 (e.g., a mouse, a touchpad, and the like), a display 1116, main memory 1110, an input/output controller 1115, and a storage device 1114. Storage device 1114 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printing system can be stored on, for example, storage device 1114. System 1100 may also be provided with additional input/output devices, such as a printer (not shown). The various components of system 1100 communicate through a system bus 1112 or similar architecture. In addition, system 1100 may include an operating system (OS) 1120 that resides in memory 1110 during operation. One skilled in the art will recognize that system 1100 may include multiple processors 1102. For example, system 1100 may include multiple copies of the same processor. Alternatively, system 1100 may include a heterogeneous mix of various types of processors. For example, system 1100 may use one processor as a primary processor and other processors as co-processors. For another example, system 1100 may include one or more multi-core processors and one or more single core processors. Thus, system 1100 may include any number of execution cores across a set of processors (e.g., processor 1102). As to keyboard 1117, pointing device 1118, and display 1116, these components may be implemented using components that are well known to those skilled in the art. One skilled in the art will also recognize that other components and peripherals may be included in system 1100.

Main memory 1110 serves as a primary storage area of system 1100 and holds data that is actively used by applications, such as the printer driver of the printing system, running on processor 1102. One skilled in the art will recognize that applications are software programs that each contains a set of computer instructions for instructing system 1100 to perform a set of specific tasks during runtime, and that the term "applications" may be used interchangeably with application software, application programs, and/or programs in accordance with embodiments of the present teachings. Memory 1110 may be implemented as a random access memory or other forms of memory as described below, which are well known to those skilled in the art.

OS 1120 is an integrated collection of routines and instructions that are responsible for the direct control and management of hardware in system 1100 and system operations. Additionally, OS 1120 provides a foundation upon which to run application software. For example, OS 1120 may perform services, such as resource allocation, scheduling, input/output control, and memory management. OS 1120 may be predominantly software, but may also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 1102), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Resources described as singular or integrated can in one embodiment be plural or distributed, and resources described as multiple or distributed can in embodiments be combined. The scope of the present teachings is accordingly intended to be limited only by the following claims.

Other embodiments will be apparent to those skilled in the art from consideration of the specification and practice of the embodiments disclosed herein. It is intended that the specification and examples be considered as exemplary only.

What is claimed is:

1. A computer-implemented method comprising:
storing, in a computer-readable storage, a plurality of software applications, each software application being associated with a respective one of a plurality of analytics algorithms, each software application being further associated with a respective one of a plurality of canonical data including a representation of a class of data to be accepted by the respective analytics algorithm associated with the software application, wherein at least two of the software applications are associated with different analytics algorithms of the plurality of analytics algorithms, and at least two of the software applications are associated with different canonical data;
storing, in the computer-readable storage, one or more questions, each question being associated with one of the plurality of software applications;
storing a user dataset associated with a domain and a data category;
selecting, via a processor, a question from the one or more questions, the selected question being selected based at least in part on the domain and the data category of the user dataset;
matching the user dataset based on a canonical data of the one of the plurality of software applications associated with the selected question, the matching being performed by the processor, the matching comprising comparing one or more fields of the user dataset with a class of data indicated by qualifications included in the canonical data, the matching thereby producing a canonicalized dataset;
executing, via the processor, an analytics algorithm associated with the one of the plurality of software applications, wherein the canonicalized dataset is provided as input to the analytics algorithm associated with the one of the plurality of software applications; and
presenting, via the processor, output from the analytics algorithm associated with the one of the plurality of software applications to the user.

2. The method of claim 1, wherein each question further comprises a domain and a user category, and wherein selecting the question from the one or more questions comprises identifying a subset of matching questions having the same domain and user category as the domain and the user category of the user dataset.

3. The method of claim 2, wherein the one or more questions include a basic question, and wherein selecting the question from the one or more questions further comprises selecting the basic question upon a determination that no question matches the domain and user category of the user dataset.

4. The method of claim 3, wherein the basic question includes a question text containing an interpolation flag, and wherein selecting the basic question comprises interpolating user-provided text with the question text of the basic question to produce interpolated question text, and presenting the interpolated question text to a user.

5. The method of claim 1, wherein each of the plurality of canonical data identifies one or more data field descriptors, and wherein matching the user dataset based on the canonical data comprises selecting fields from the user dataset based at least in part on the one or more data field descriptors of the canonical data.

6. The method of claim 1, wherein each software application further comprises data indicative of a mapping to the respective analytics algorithm associated with the software application, and wherein executing the analytics algorithm associated with the software application comprises mapping the canonicalized data to the input to the analytics algorithm based on data indicative of the mapping.

7. The method of claim 1, wherein the user dataset is received from an external computer system via a network interface of an analytics system.

8. The method of claim 7, further comprising:
identifying a subset of matching questions from the one or more questions based at least in part on the domain and data category of the user dataset;
transmitting, to the external computer system, a user interface identifying the subset of matching questions; and
receiving a user form response from the external computer system via the transmitted user interface, wherein selecting the question from the one or more questions is based at least in part on the user form response.

9. The method of claim 1, wherein the canonical data for each software application is determined based on an abstraction operation performed by the analytics system, the abstraction operation comprising:
identifying an example dataset associated with the respective software application; and
determining one or more field descriptors based on the example dataset.

10. The method of claim 9, wherein determining the one or more field descriptors is based at least in part on a selection of fields by an operator of the analytics system.

11. The method of claim 9, wherein each field descriptor identifies a data type and one or more characteristics of a data field.

12. The method of claim 9, wherein the one or more field descriptors are determined based at least in part on inputs associated with the respective analytics algorithm associated with the respective software application.

13. The method of claim 9, wherein the example dataset is uploaded to the analytics system by an operator of the analytics system.

14. The method of claim 1, wherein matching the user dataset based on the canonical data of the respective one of the plurality of software applications comprises identifying an ambiguity in matching at least one descriptor of the respective canonical data of the respective one of the plurality of software applications, and requesting manual interaction to resolve the ambiguity.

15. The method of claim 14, wherein the ambiguity involves a descriptor of the canonical data of the one of the plurality of software applications not matching any field of the user dataset or matching multiple fields of the user dataset.

16. A computer system, comprising:
a processor, implemented at least in part in hardware;
an application store accessible by the processor and comprising computer-readable storage, having stored therein a plurality of software applications, each software application being associated with a respective one of a plurality of analytics algorithms, each software application being further associated with a respective one of a plurality of canonical data indicative of a class of data to be accepted by the analytics algorithm associated with the software application, wherein at least two of the software applications are associated with different analytics algorithms of the plurality of analytics algorithms, and at least two of the software applications are associated with different canonical data;

a question store accessible by the processor and comprising computer-readable storage, having stored therein one or more questions, each question being associated with one of the plurality of software applications;

a user dataset store comprising computer-readable storage, accessible by the processor, and having stored therein a user dataset associated with a domain and a data category;

a question selection module accessible by the processor and configured to select a question from the one or more questions, the selected question being selected based at least in part on the domain and the data category of the user dataset;

a dataset matching module configured to match the user dataset based on the respective canonical data of the respective one of the plurality of software applications associated with the selected question, the matching being performed by the processor, the matching comprising comparing one or more fields of the user dataset with a class of data indicated by qualifications included in the respective canonical data, the matching thereby producing a canonicalized dataset; and an application execution module accessible by the processor and configured to execute an analytics algorithm associated with the one of the plurality of software applications, wherein the canonicalized dataset is provided as input to the analytics algorithm associated with the one of the plurality of software applications.

17. A computer-implemented method comprising:

receiving a user dataset;

selecting a question to be answered with respect to the user dataset from a plurality of questions, the selection being based on stored attributes of the plurality of questions and further being based on attributes of the user dataset, each of the plurality of questions being associated with one of a plurality of software applications, each of the plurality of software applications being associated with a respective one of a plurality of analytics algorithms and a respective one of a plurality of canonical data indicative of a class of data to be accepted by the analytics algorithm associated with the software application, wherein at least two of the software applications are associated with different analytics algorithms of the plurality of analytics algorithms, and at least two of the software applications are associated with different canonical data;

reconfiguring the user dataset to conform with one or more inputs associated with an analytics algorithm associated with an software application associated with the selected question, the analytics algorithm associated with the respective software application associated with the selected question being identified by the computer processor as being configured to respond to the selected question; and executing the analytics algorithm based on the reconfigured user dataset.

18. The computer-implemented method of claim 17, wherein the respective canonical data associated with each of the plurality of software applications identifies one or more data field descriptors;

each field descriptor identifies a data type and one or more characteristics of a data field; and the one or more field descriptors are determined based at least in part on inputs associated with the respective analytics algorithm associated with the respective software application.

* * * * *